Patented Feb. 21, 1933

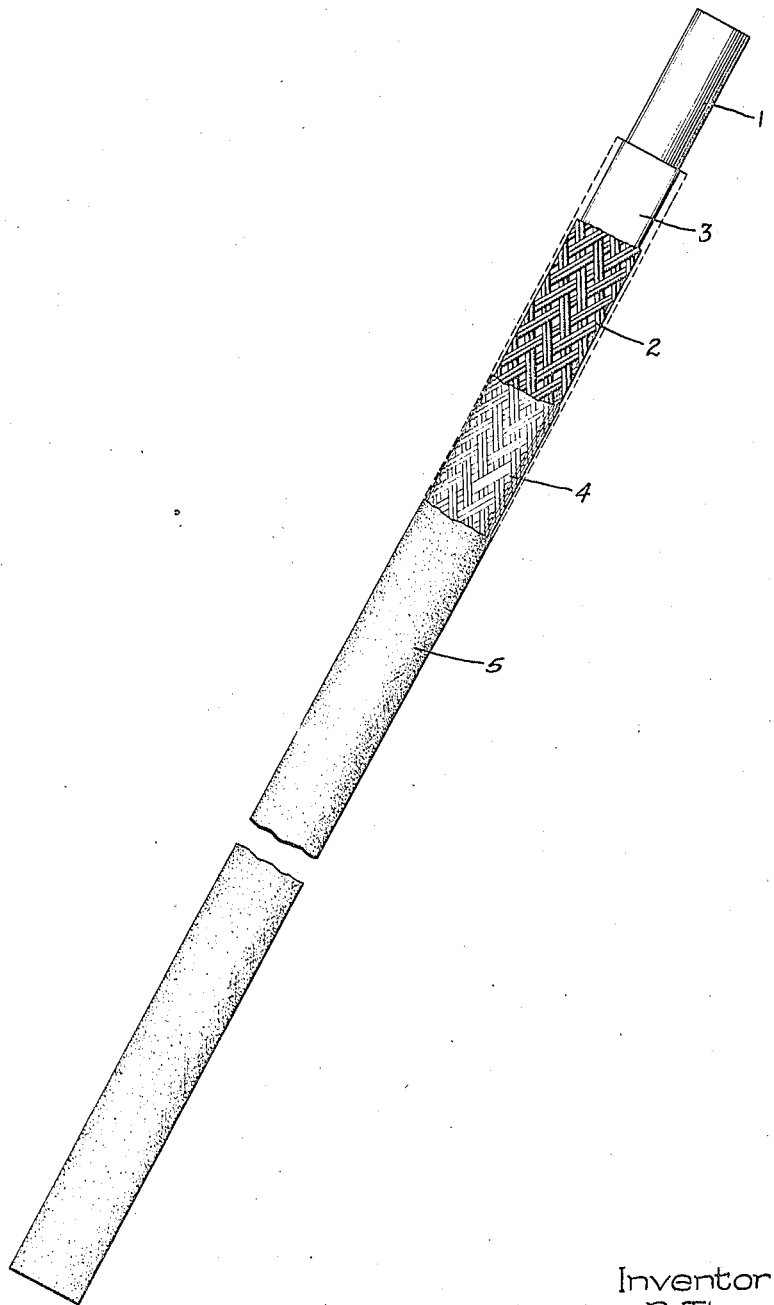

1,898,068

UNITED STATES PATENT OFFICE

LUCIAN B. THOMPSON, OF SCOTIA, AND VERNI J. CHAPMAN, OF SCHENECTADY, NEW YORK, ASSIGNORS TO GENERAL ELECTRIC COMPANY, A CORPORATION OF NEW YORK

WELDING ELECTRODE

Application filed January 28, 1932. Serial No. 589,388.

Our invention relates to electrodes for use in metallic arc welding.

In metallic arc welding an arc is maintained between the work to be welded and a rod, wire, or strip of metal usually referred to as an electrode. During welding the electrode is fused or vaporized or both and the metal thereof deposited upon and welded to the work as the electrode is fed toward the work, either manually or automatically, so as to maintain the arc length substantially constant.

The quality of the metal deposited by such a process depends to a large extent upon the influence of certain elements or compounds associated with the electrode, usually in the form of a coating. Electrodes so coated are commonly designated as flux coated electrodes.

It is an object of our invention to provide an improved flux coated electrode.

It is a further object of our invention to provide a coated electrode which can be handled or bent without having the coating flake or separate therefrom.

It is another object of our invention to provide a fluxed electrode the coating of which will not burn back from the tip of the electrode during welding, but will provide for it a protecting sleeve which projects slightly beyond the melting tip of the electrode.

It is a further object of our invention to provide an electrode for producing dense, ductile welds of high tensile strength such as are required in fired or unfired pressure vessels and similar constructions.

It is another object of our invention to provide a flux coating for welding electrodes which will adequately protect the weld metal during the process of welding, and which may be easily removed from the finished weld after the welding operation.

It is a further object of our invention to provide an electrode having a high melting rate and capable of depositing the weld metal in an extremely fluid state for producing flat welds of exceptional penetration.

Further objects of our invention will appear from the following description taken in connection with the accompanying drawing which illustrates one embodiment thereof.

The electrode illustrated in the drawing comprises a metal rod 1 provided with a covering of cellulosic material 2 filled with a material of substantially the following composition:

| | Parts by weight |
|---|---|
| Ferro-manganese | 10 |
| Talc | 10 |
| Feldspar | 30 |
| Sodium silicate (liquid) | 24 |

The above ingredients are preferably in powdered form and when mixed form a paste which may be diluted with water, if necessary, to produce the proper consistency for adhering to the rod and cellulosic material. The water addition may be from two to six parts by weight.

According to one method of manufacturing disclosed and claimed in application, Serial No. 589,386 of James M. Weed for welding electrodes filed concurrently herewith and assigned to the same assignee as the present application, an electrode according to our invention the rod 1 is first passed through a bath of the above coating paste from which it emerges through a die which gives it a desired thickness of coating such as illustrated in the drawing at 3. The cellulosic material is then applied as a braid 2 woven about the rod and embedded in this initial coating 3. The rod is then passed through a second bath of coating paste which is rubbed into the braid completely filling its interstices and producing a surface such as illustrated at 4 in the drawing. The surface of the electrode may then be dusted with a drying powder consisting of 10 parts by weight of talc to 30 parts by weight of feldspar, giving the rod a surface coating such as illustrated at 5.

The ferro-manganese employed as one of our flux constituents is preferably of low carbon content; that is, it has a carbon content of less than 1.5 per cent. The liquid sodium silicate which we have employed has an average specific gravity of about 1.36; an average water content of about 61 per cent; an average SiO₂ content of about 28 per cent, and an average Na₂O content about 8 per cent.

We prefer to use a comparatively thick coating of our fluxing material on welding electrodes. For quarter inch electrode stock we prefer to employ a coating of about three sixty-fourths of an inch in thickness, the relative proportions of electrode and coating being well illustrated in the accompanying drawing. It is to be understood, however, that our flux may be applied as a thinner or thicker coating than that illustrated, and that our invention is not limited to any thickness of coating, although we prefer to employ coatings of substantial thickness.

In operation the coating does not burn back from the melting tip of the electrode but provides a protecting sleeve which projects slightly beyond the same. The constituents of the flux protect the metal of the electrode from the surrounding atmosphere during its transfer to the work and as a slag covering on the weld protects the weld metal from the surrounding atmosphere during cooling and solidification of the same. The flux coating when molten is very viscous but, upon cooling, becomes brittle and often separates from the work of its own accord leaving the weld metal bright and untarnished. Immediately after the welding operation the flux coating may be readily removed by a light chipping operation or by scratching with a wire brush.

Our improved electrode operates best with reverse polarity; that is, with the electrode connected to the plus terminal of the source of supply. The voltage of a welding arc maintained with our electrode is considerably greater than that obtained when using a bare electrode. With our electrode the voltage ranges from 30 to 40 volts and the electrode material is melted quite rapidly and deposited in a highly fluid state which results in exceptional penetration and the production of flat welds. Our electrode functions best when depositing welding material in a downward direction.

The metal deposited when welding with our improved electrode is substantially free of gas holes and slag inclusions. The average specific gravity of the weld metal taken from welds made by three different operators was about 7.84. The average tensile strength of the weld metal was about 65,000 pounds per square inch and the elongation in two inches varied from 26 to 33 per cent. The specimens of the weld metal employed in making these tests were taken entirely from the deposited weld metal as specified in the Rules for Construction of Unfired Pressure Vessels, Section VIII of The American Society of Mechanical Engineers' Boiler Construction Code for 1931, Part U-68, "Class 1." Tensile tests of coupons of reduced section of the dimensions specified in the rules above referred to, all broke outside the weld, and free-bend tests made in accordance with these same rules were all over 30 per cent with no fracture whatever showing. In all cases the test specimens were bent through 180° and very often flattened without showing a fracture in the bend. Welds of the above quality satisfactorily meet the requirements of The American Society of Mechanical Engineers' Boiler Construction Code for fired pressure vessels and "Class 1" unfired pressure vessels.

When using an electrode metal of the following composition:

| | |
|---|---|
| Carbon | .17 per cent |
| Manganese | .54 per cent |
| Sulphur | .013 per cent |
| Phosphorus | .025 per cent |
| Silicon | A trace, and |
| Iron | Remainder | and a flux as above specified the chemical analysis of the weld metal was of follows:

| | |
|---|---|
| Carbon | .04 per cent |
| Manganese | .73 per cent |
| Sulphur | .034 per cent |
| Phosphorus | .020 per cent |
| Silicon | .42 per cent and |
| Iron | Remainder |

Welding electrodes according to our invention may be produced in short lengths with one end thereof bared for use in hand-welding, or in long lengths for use in automatic or semi-automatic welding machines. In hand-welding the bared portion of the electrodes is inserted in an electrode holder and the welding operation performed by an operator who feeds it toward the work in accordance with its consumption in the arc. In automatic arc welding the electrode is fed toward and away from the work to strike and thereafter maintain a welding arc by means of a mechanism that functions in response to a characteristic of the welding arc such as its voltage or current. In such automatic machines current is fed to the electrode through incisions made in the coating, or by removing a portion of the coating and feeding current to the electrode through the portions of the electrode thus bared.

Although the flux paste constituents above referred to may be used alone as a flux, best results are obtained when using these constituents with cellulosic material. I prefer to apply the cellulosic material as a textile. It may be woven about the electrode or applied thereto in the form of a strip of cloth or gauze wound spirally about the same. The drying powder above referred to is used principally to expedite the manufacturing process and is not a necessary element of our invention. The relative proportions of the parts above specified may be slightly varied from the proportions above stated without departing from our invention. By increasing the manganese content of the fluxing material the tensile strength of the weld is increased and its ductility decreased. Likewise by decreasing the manganese content the ductility of the weld is increased while its tensile strength is decreased. The talc addition increases the fluidity of the slag and by increasing the amount of this material in the flux, the slag produced may be rendered more fluid.

What we claim as new and desire to secure by Letters Patent of the United States, is:

1. A flux for use in arc welding operations having substantially the following composition: ferro-manganese 10 parts by weight; talc 10 parts by weight; feldspar 30 parts by weight, and liquid sodium silicate 24 parts by weight.

2. A flux for use in arc welding comprising a cellulosic material impregnated with a substance of substantially the following composition: ferro-manganese 10 parts by weight; talc 10 parts by weight; feldspar 30 parts by weight, and liquid sodium silicate 24 parts by weight.

3. A welding electrode having a covering of cellulosic material impregnated with a material of substantially the following composition: low carbon ferro-manganese 10 parts by weight; talc 10 parts by weight; feldspar 30 parts by weight, and liquid sodium silicate 24 parts by weight.

4. A welding electrode of iron having a surface coating of cotton textile material embedded in a fluxing material of substantially the following composition: low carbon ferro-manganese 10 parts by weight; talc 10 parts by weight; feldspar 30 parts by weight, and liquid sodium silicate 24 parts by weight, and covered with a powder of substantially the following composition: talc 10 parts by weight and feldspar 30 parts by weight.

5. A welding electrode of substantially the following composition: carbon .17 per cent; manganese .54 per cent; sulphur .013 per cent! phosphorus .025 per cent; silicon a trace, and iron the remainder, having a surface coating of impregnated cellulosic material of substantially the following composition; low carbon ferro-manganese 10 parts by weight; talc 10 parts by weight; feldspar 30 parts by weight, and liquid sodium silicate 24 parts by weight.

In witness whereof we have hereunto set our hands.

LUCIAN B. THOMPSON.
VERNI J. CHAPMAN.